United States Patent [19]

Schlichte

[11] 4,107,480
[45] Aug. 15, 1978

[54] PULSE CODE MODULATED, TIME DIVISION MULTIPLEX SWITCHING NETWORK

[75] Inventor: Max Schlichte, Munich, Germany

[73] Assignee: Siemens Aktiengesellschaft, Munich, Germany

[21] Appl. No.: 747,933

[22] Filed: Dec. 6, 1976

Related U.S. Application Data

[63] Continuation of Ser. No. 563,096, Mar. 28, 1975, abandoned.

[30] Foreign Application Priority Data

Mar. 29, 1974 [DE] Fed. Rep. of Germany ....... 2415367

[51] Int. Cl.² ............................................... H04J 3/00
[52] U.S. Cl. ................................................. 179/15 AT
[58] Field of Search ........... 179/15 AT, 15 AQ, 15 A

[56] References Cited

U.S. PATENT DOCUMENTS

| | | | |
|---|---|---|---|
| 3,597,548 | 8/1971 | Drinnan et al. ................ | 179/15 AT |
| 3,673,335 | 6/1972 | Joel, Jr. ........................... | 179/15 AQ |
| 3,743,789 | 7/1973 | Krupp ............................. | 179/15 BY |
| 3,890,469 | 6/1975 | Kelly et al. ...................... | 179/15 AT |

*Primary Examiner*—Thomas W. Brown
*Attorney, Agent, or Firm*—Schuyler, Birch, Swindler, McKie & Beckett

[57] ABSTRACT

A pulse code modulation, time division multiplex (PCM/TDM) switching network is used in tandem exchanges for connecting receive and transmit trunks and for allocating receive time slots to time slots to be used on the transmit trunks is described. A storage is assigned to each pair of associated receive and transmit trunks. The storage includes storage areas which are selectively connectable to the associated pairs of trunks. A storage location used for a call is seized sequentially during each sampling pulse frame with data coming in over the receive trunk as well as with data outgoing over the transmit trunk. Inputs and outputs of the storage areas not connectable to the trunks are combined with coordinated inputs or outputs of the storage areas of other similar storages. Information output and input likewise takes place selectively over the combined inputs or outputs.

7 Claims, 5 Drawing Figures

PULSE CODE MODULATED, TIME DIVISION MULTIPLEX SWITCHING NETWORK

This is a continuation of application Ser. No. 563,096 filed Mar. 28, 1975, abandoned.

BACKGROUND OF THE INVENTION

The invention concerns a pulse code modulation, time division multiplex switching network of a PCM/TDM tandem exchange for the connection of receive PCM/TDM trunks to transmit PCM/TDM trunks, and the time allocation of time slots employed on the receive PCM/TDM trunks to time slots to be used on the transmit PCM/TDM trunks.

PCM/TDM switching networks of this type and of known construction are divided into TDM and space division multiplex (SDM) switching stages. The TDM switching stages have buffer storages in which the PCM signals are stored intermediately during the time period between the time position corresponding to the channel utilized on a receive PCM/TDM trunk coming into the exchange and the time position corresponding to the channel used on the transmit PCM trunk emanating from the exchange and associated with the connection involved. The SDM switching stages include crosspoints activated periodically by pulses, the receive TDM trunks being connected to the transmit TDM trunks over said crosspoints.

Various configurations may be formed in the above PCM/TDM switching networks of known construction through selection of the number of stages of the SDM switching stages and the succession of SDM and TDM switching stages. These various configurations are complex in their construction, and expensive, but their load-carrying capacity is relatively great.

With a growing number of PCM/TDM trunks to be connected, the use of a one-stage SDM switching stage rapidly leads to very large switching rows, consequently to a very large number of multiple-connected crosspoints. Therefore, such a configuration is, from the outset, not suitable for use in large exchanges. In the case of a two-stage SDM switching stage, the individual switching rows are smaller, but the number of links between groups of switching (or crosspoint) matrices associated with different switching stages must be smaller with a growing number of PCM/TDM trunks to be connected. In this case the danger of congestion increases if the switching network carries an uneven load from the PCM/TDM trunks.

If only a single TDM switching stage is employed for the construction of such a PCM/TDM switching network, the time position may be changed only once during the call setup, i.e., in every case either the time position seized on the receive TDM trunk or the time position which shall be seized on the transmit TDM trunk must be utilized in the SDM section of the switching network, thereby increasing the danger of time-slot congestions. This danger may be reduced by providing two TDM switching stages that enable a twice-repeated time-slot conversion, thereby rendering the switching in the SDM section of the switching network independent of the time positions on the TDM trunks, or by providing for expansion of the SDM repeater matrix. In both cases, however, the small probability of time-slot congestions is obtained at the price of greater expense.

Differences in the succession of TDM and SDM switching stages, likewise, lead to different traffic characteristics.

In a switching network in which the SDM switching stages are arranged between an input-side and an output-side TDM switching stage, as indicated hereinabove, the switching in the SDM section of the switching network is independent of the time positions utilized on the TDM trunks. However, "bottlenecks" occur at the inputs and outputs of the SDM switching network, since the possibility of switching an item of information on various SDM paths is solely provided within the SDM switching network. Thus, in order to avoid these bottlenecks, more components would also be required in this configuration, because of the requirement for expansion of the SDM switching network, such that several inputs and outputs of the SDM switching network are made available for each PCM/TDM trunk.

If the reversed configuration is selected, i.e., if a TDM switching stage is placed between an input-side and an output-side SDM switching stage, one is limited during the switching in the SDM section of the switching network to the time positions utilized on the PCM receive TDM trunk and on the PCM transmit TDM trunk which, as indicated hereinabove increases the danger of time-slot congestions. Moreover, the storage in such a centrally located TDM switching stage cannot be used as a buffer storage, so that for the equalization of delay times buffer storages allocated to individual lines must precede the input-side SDM section of the switching network.

Likewise, the alternate succession of several SDM or TDM switching stages does not solve the problems described hereinabove. As in the case of the stage succession mentioned hereinabove, one faces in multiple alternate stage successions the problem of bottlenecks occurring at the inputs and outputs of the SDM section of the switching network. That is, there is the time-congestion problem mentioned above with respect to the input/output-side SDM switching stages, and the bottleneck problem with respect to the central SDM switching stage.

The time-channel congestion problems in PCM switching networks of known construction are reduced in that operation in the exchanges takes place with a number of time positions greater than the number of the channels utilized on the TDM trunks. Since the power consumption in the PCM exchanges must retain restricted (rules having been laid down according to which it must not exceed 230 W per $m^2$ of rack surface), with the present state of the art must resort to circuit techniques that do not tolerate operations at higher operating speeds or to operations that result in loss of time (e.g., a series-parallel conversion).

Bearing the above conditions in mind, it is an object of the invention to design a PCM/TDM switching network having better traffic characteristics and using fewer components than switching networks of known construction.

SUMMARY OF THE INVENTION

In accordance with the invention, the foregoing and other objects are achieved in that in a PCM/TDM switching network of the type mentioned hereinabove a storage having an amount of data transferrable over a PCM/TDM trunk within a sampling pulse frame and having an appropriate storage capacity is allocated to each pair of associated receive and transmit PCM/TDM trunks. The storage has storage areas connectable selectively to the PCM/TDM trunks, wherein a storage location used for a call is sequentially seized during each sampling pulse frame with data coming in over the receive PCM/TDM trunk, as well as with data to be transferred over the transmit PCM/TDM trunk. Inputs and outputs of the storage areas not connectable to the PCM/TDM trunks are combined with coordinated inputs or outputs of the storage areas of other such storages. The information output or input, likewise, takes place selectively over the combined inputs or outputs.

In the PCM/TDM switching network constructed according to the invention, there is no rigid separation between SDM and TDM switching stages, at least not on the input and output sides. Rather, the storages assigned to the PCM/TDM trunks, in which writing in and reading out occur selectively, are combined SDM/TDM switching stages. These combined SDM/TDM switching stages conform to the basically contradictory demands in switching networks, i.e., arranging the TDM switching stages, if possible, on the periphery of the switching network so as to through-connect several time slots for the selection and placing the TDM switching stage such that it is included in all the available SDM paths. This results in avoidance of the bottlenecks mentioned hereinabove.

One economizes on the number of storage locations due to the seizure of the storage areas one after another during each sampling pulse frame both with data coming in over the receive PCM/TDM trunk and with data to be transferred over the transmit PCM/TDM trunk. This storage organization is particularly of importance if, according to a further development of the invention, the combination of outputs and inputs of storage areas not connectable to PCM/TDM trunks is carried out in groups for several storages, and if the combined outputs of the groups of storages are connectable over an SDM switching network having coordinated combined inputs of the other groups of storages. In this case, the switching network constructed according to the invention constitutes an arrangement comprising two TDM switching stages that include a SDM switching stage thereby ensuring the flexibilities mentioned above during the through-connection in the SDM switching stage located nearer the middle. Since the storages are divided into areas and activated selectively, both during writing in and during reading out, depending on whether they are considered in the context of a receive TDM trunk or a transmit TDM trunk (e.g. as an SDM switching stage having a subsequent TDM switching stage or a TDM switching stage having a subsequent SDM switching stage), there results a configuration in the abovementioned further development of the invention that corresponds to a switching network having three SDM switching stages, wherein there is no dependency on varying traffic intensities mentioned at the start of this application owing to the individual PCM/TDM trunks.

According to other developments of the invention, the switching network is divided into modules to facilitate step-by-step expansion and for conveniently constructing within these modules the storage areas allocated to individual lines with associated selection circuits or the modules of the SDM switching circuit establishing the connections from storage group to storage group.

BRIEF DESCRIPTION OF THE DRAWINGS

The principles of the invention will be more readily understood by reference to the description of a preferred embodiment given hereinbelow in conjunction with five figures of drawings, which are briefly described below.

DETAILED DESCRIPTION OF THE DRAWINGS

Figure 1:
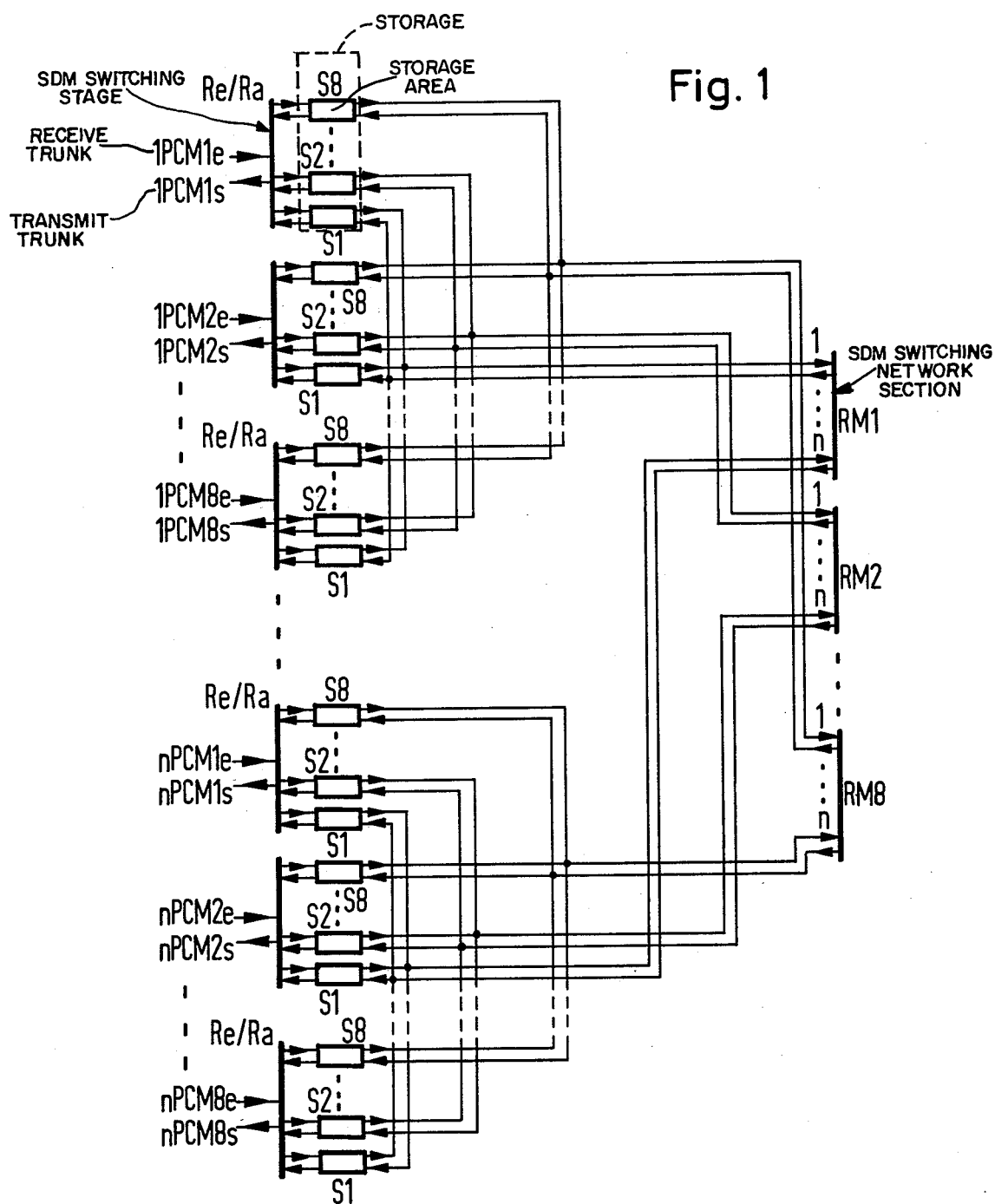
FIG. 1 is a schematic diagram of a preferred embodiment of the PCM switching network according to the invention, greatly simplified for better understanding.

As illustrated in FIG. 1, n groups of eight PCM/TDM trunks each are connected to the PCM/TDM switching network of the invention. They are receive PCM/TDM trunks $l$PCM$e$ to $n$PCM8$e$ and transmit PCM/TDM trunks $l$PCM1$s$ to $n$PCM8$s$.

A storage is allocated to each pair of associated receive PCM/TDM trunks and transmit PCM/TDM trunks. The storage corresponds in its storage capacity to the amount of data transmittable over a PCM/TDM trunk within a sampling pulse frame. Thus, in the case of the usual PCM system 30/32, wherein 32 PCM words of eight bits each can be transferred within a sampling pulse frame, there are 32 storage locations for every eight bits. Such a storage may be made up of shift registers such as shown in U.S. Pat. No. 3,050,589.

These storages are subdivided into a number of storage areas; in the present case the storages are divided into eight storage areas S1 to S8. The storage areas are selectively connectable to the PCM/TDM trunks to which they are assigned, as shown in FIG. 1, by the SDM switching stages R$e$/R$a$, and they are in communication on the one side with the pairs of PCM/TDM trunks and on the other side with the storage areas S1 to S8. Such SDM switching stages may, in principle, be constructed in the manner shown in U.S. Pat. No. 3,281,536. The principles of operation and timing relationships described for the patented SDC switching stages are equally applicable to the switching stages R$e$/R$a$, described herein.

The storages referred to above, or the individual storage areas thereof, are activated such that a storage location used for a given connection is seized sequentially during each sampling pulse frame both with data coming in over the receive PCM/TDM trunk and with data to be transferred over the transmit PCM/TDM trunk. Accordingly, as shown in FIG. 1, the receive and the transmit PCM/TDM trunk of a pair of TDM trunks each have access to all the storage areas S1 to S8.

Figure 4:
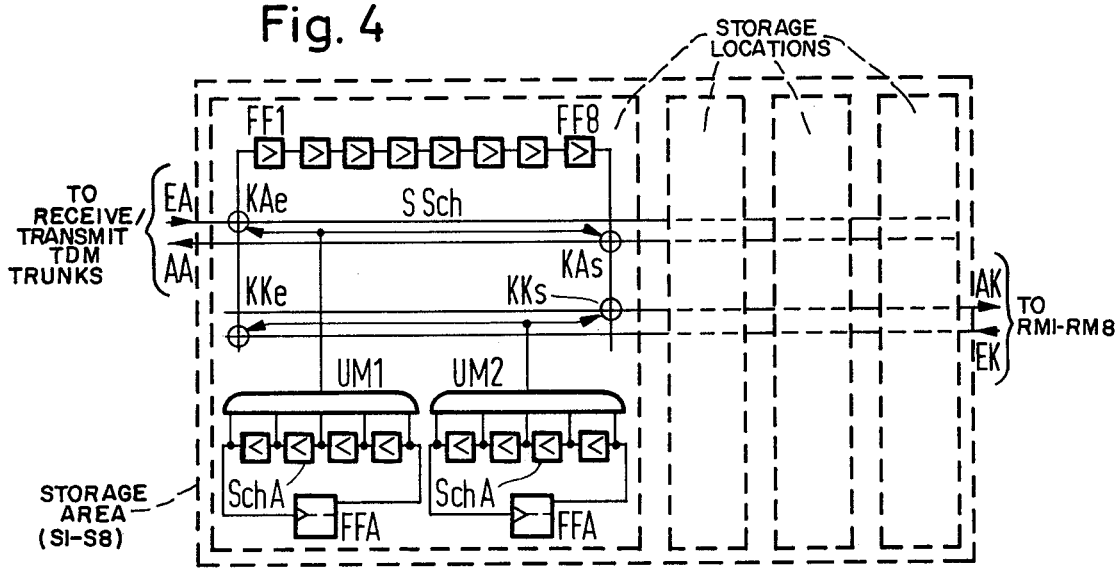
FIG. 4 is a schematic diagram of a component employed for realizing the storage areas of the invention.

From FIG. 4 it is apparent that each of the individual storage areas, in addition to the input connectable to a receive PCM/TDM trunk and to the output connectable to a transmit TDM trunk (in FIG. 1 they are the inputs or outputs connectable to the TDM switching network R$e$/R$a$), has another input and another output.

The other inputs and outputs of the individual storage areas are combined with coordinated inputs or outputs of the storage areas of other such storages. Thus, the other inputs of all the storage areas S1 of the storages assigned to the TDM trunks PCM1 to PCM8 are connected together, and the other outputs of the storage areas S2 of the storages assigned to said TDM trunks are connected together.

Also apparent from FIG. 1 is the fact that the above combination of outputs and inputs of storage areas not connectable to PCM/TDM trunks takes place for several storages in groups, i.e., as mentioned hereinabove, n groups of PCM/TDM trunks, and n groups of storages. The combined outputs of the groups of storages are connectable over a SDM switching stage to coordinated combined inputs of the other groups of storages. If the storages are divided into eight storage areas, the SDM switching network has eight independent switching network sections RM1 to RM8, of which the switching network section RM1 serves for the connection of combined outputs of first storage areas S1 to combined inputs of first storage areas S1 of other groups. The second switching network section RM2 for the corresponding connection of outputs and inputs of second storage areas S2 of various groups of storages, and the remaining connections occur in a like manner.

Figure 2:
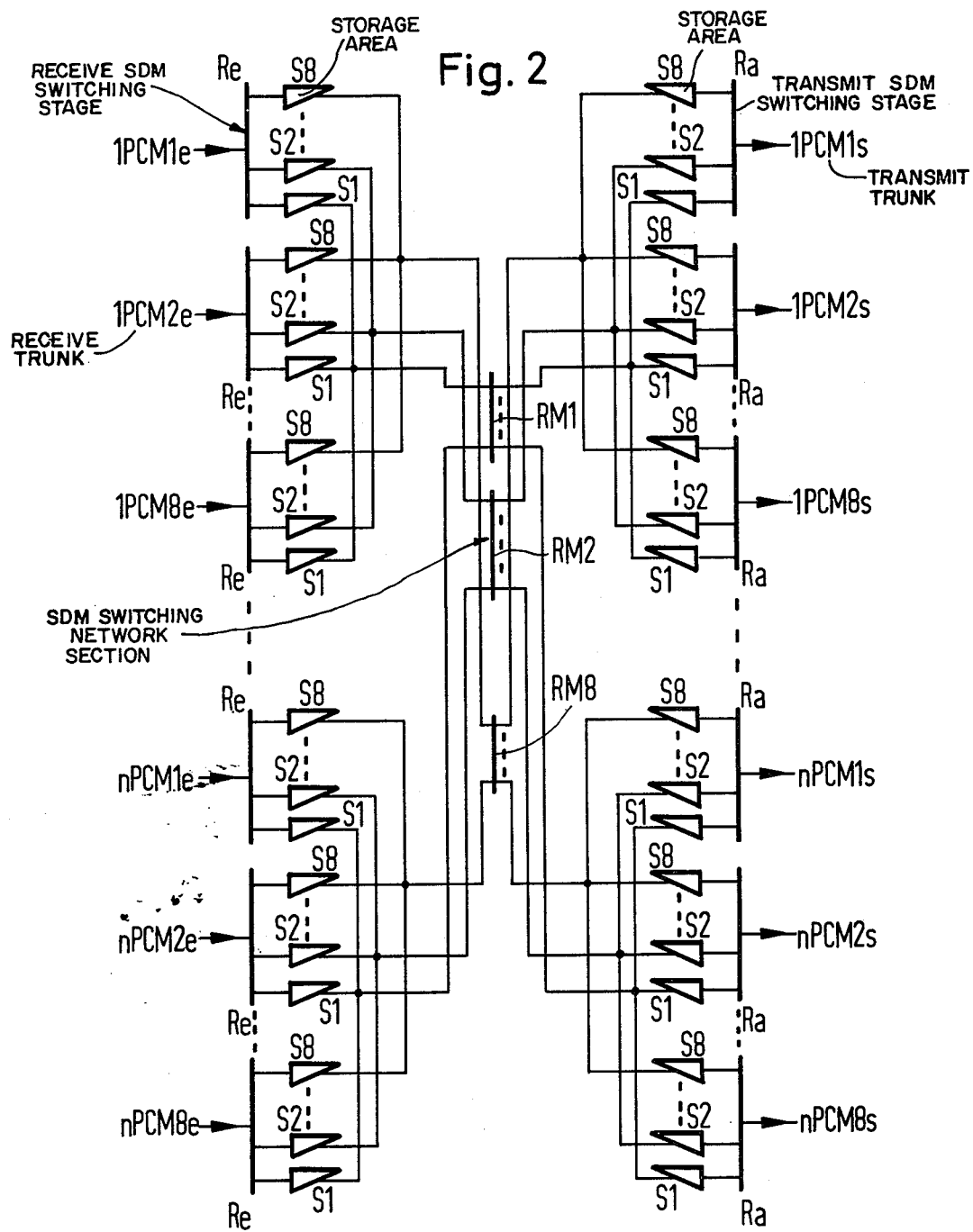
FIG. 2 is a schematic diagram of an enlarged view of a PCM switching network like that illustrated in FIG. 1.

The PCM/TDM switching network depicted in FIG. 1 corresponds in its operating mode to a switching network, as illustrated in FIG. 2, where an expanded graphical presentation is employed, i.e., the receive PCM/TDM trunks of the pairs of TDM trunks are shown on one side of the switching network and the transmit PCM/TDM trunks thereof are shown on the other side. Thus, for both directions of an established connection the data transmission always occurs from left to right. For the individual storage areas semi-rectangles were selected in the graphical presentation of FIG. 2 so as to indicate that owing to the complementary operation of the storages only half the space requirement is present with respect to switching networks in which a separate storage location is seized for data transmitted in the receive direction and for data transmission in the send direction during one and same connection.

FIG. 2 shows that the PCM switching network according to the invention has a so-called (RZ) R(ZR) structure, where the parentheses indicate that a combined SDM switching stage is involved in the input side stage succession RZ, and a combined SDM/TDM or TDM/SDM switching stage in the output side stage succession ZR, in which rigid separation between SDM and TDM switching stage is no longer possible. Thus, as mentioned hereinabove, the problems are avoided that arise if only true TDM switching stages are disposed on the input and output side or a true TDM switching stage is placed between true SDM switching stages.

It is likewise apparent from FIG. 2 that the switching network performs the function of an arrangement wherein two TDM switching stages are present for each pair of PCM trunks, thereby providing for flexibility for the selection of the time position in the SDM stage RM1 to RM8 nearer the middle, and wherein the SDM through-connection takes place through three stages, i.e., according to a SDM switching stage succession Re, RM and Ra.

The procedures taking place in a connection of PCM/TDM trunk 1PCM1 of the first group to the PCM/TDM trunk nPCM8 of the n group will now be described, insofar as is necessary for an understanding of the invention. For purposes of this description it will be assumed that the time slot 10 is employed on the TDM trunk 1PCM1, the time slot 20 on the TDM trunk nPCM8, and the time slot 17 in the SDM switching network RM.

It is likewise assumed that within the switching network for the relevant connection the eighth SDM mesh is free, i.e., buses that are in communication with the eighth storage locations S8 of the storages.

A PCM word coming in over the PCM/TDM trunk 1PCM1e during the time slot 10 is then written randomly into a storage location of the storage area S8 of the storage assigned to said TDM trunk without limiting the storage locations to the succession of time channels. The same holds true for a PCM word coming in over the receive PCM/TDM trunk nPCM8e during the time slot 20; this PCM word, likewise, being written into a storage location of the storage area S8 of the storage assigned to the TDM trunk nPCM8.

During the times corresponding to the time slot 17, the PCM words are read out of the areas S8 of the storages in which they have been received and fed to the storage S8 of the storage associated with the trunk to which they are to be connected over the switching network section RM8 of the SDM switching network nearer the middle. That is, the PCM words are fed in the case of the storage area S8 of the storage assigned to the TDM trunk nPCMB into a storage row which is free between the times of channel 17 and channel 10, in the case of the storage area S8 of the storage assigned to the TDM trunk 1PCM1 into a storage row which is free between the time of channel 17 and the time of channel 20. The storage rows of the storage areas S8 of both storages are, thus, read out toward the SDM switching network nearer the middle and seized immediately thereafter with information supplied therefrom.

In the following period of time corresponding to channel 10 the storage row in the storage area S8 of the storage assigned to the PCM trunk 1PCM1 is read out over the transmit PCM/TDM trunk, whereupon, immediately thereafter, the storage row is seized again with a PCM word coming in over the receive PCM/TDM trunk 1PCM1eduring said time period. The same holds true for the storage area S8 of the storage assigned to the TDM trunk nPCM8 during the subsequent time period of channel 20. These procedures are repeated periodically during the existance of the connection.

Figure 3:
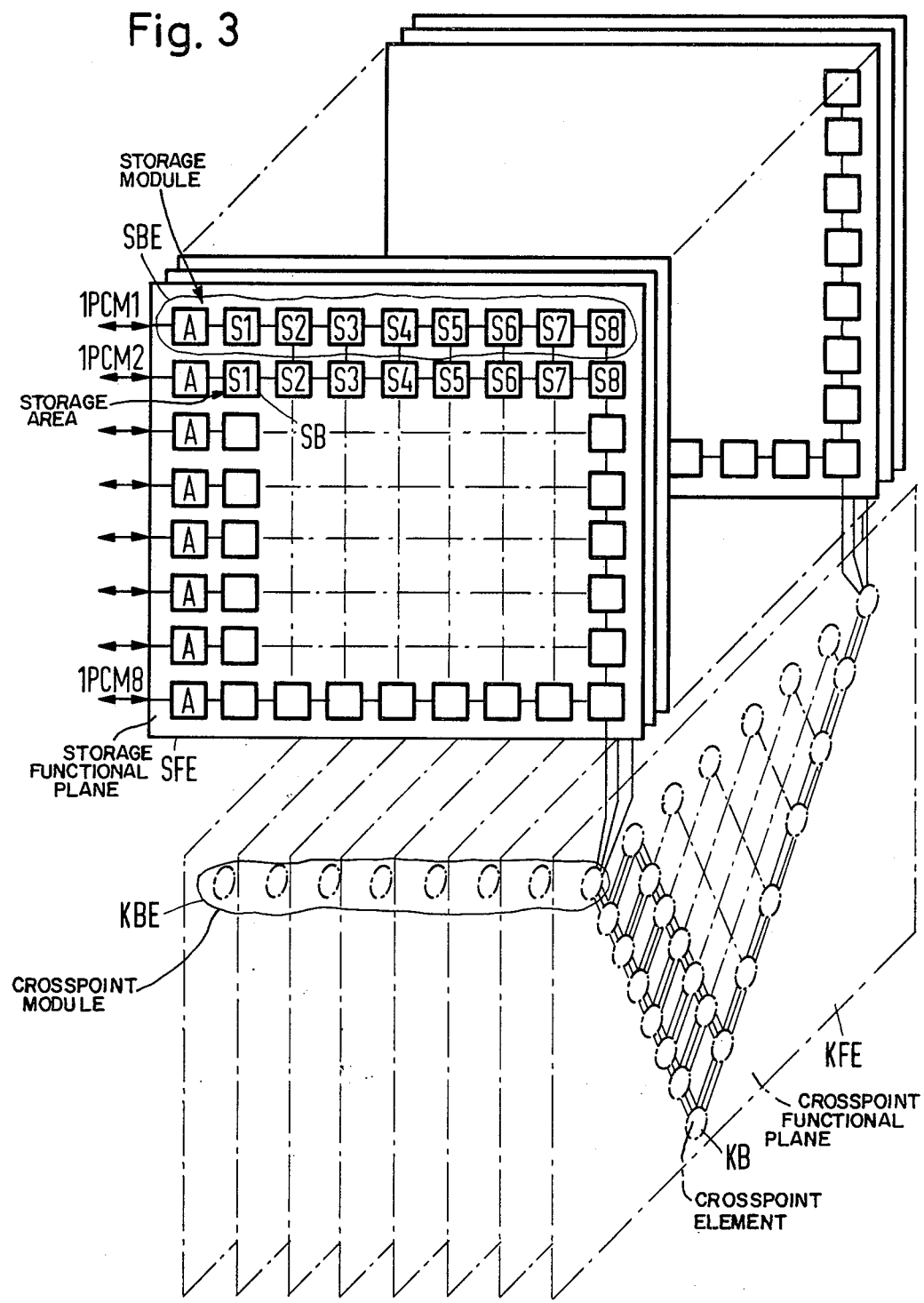
FIG. 3 is a schematic diagram illustrating the division of a fairly large PCM switching network constructed according to the invention into structural and functional entities.

FIG. 3 shows the division of the PCM/TDM switching network into functional and structural entities for use with a large number of PCM/TDM trunks and if step-by-step expansion is to be expected.

In this trunking scheme, every eight PCM/TDM trunks PCM1 to PCM8 with the storages assigned thereto, form a storage functional plane SFE. Within the storage functional plane, each of the storages having eight storage areas S1 to S8 each and assigned individually to a PCM/TDM trunk forms in conjunction with other devices allocated to the individual lines, with which is associated an adapter and synchronizing unit A, a storage element SBE. Such a storage element may, in turn, be composed of a number of structurally identical storage elements SB, each forming a storage area.

As apparent from FIG. 3, with the division of the individual storages into eight storage areas, eight crosspoint functional planes KFE are present, and these are functionally independent of one another and include the crosspoints of the SDM switching network RM nearer the middle, as shown in FIG. 1 or 2. Constituents of the crosspoint functional planes include crosspoint elements KB, by means of which connections may be established between storage areas from three combined storage functional planes SFE. The construction of these crosspoint elements KB will be detailed hereinbelow. The crosspoint elements KB are connected in the crosspoint planes KFE with adjacent crosspoint elements or with other groups of 3 storage functional planes SFE, such that connections may be established between coordinated storage areas of all groups of 3 storage functional planes SFE.

Eight crosspoint elements KB from another crosspoint functional entity KFE, which are identical in function and position within said crosspoint functional planes, are combined into crosspoint elements KBE.

The construction of a storage element SB will be described hereinbelow with reference to FIG. 4 which, as mentioned hereinabove, comprises as a structural unit one of the areas of the storages constructed according to the invention.

Such a storage element comprises a number of shift registers, the number depending on the number of PCM words to be stored in a storage area. Thus, if, as assumed in the preferred embodiment described hereinabove, the storages are divided into eight storage areas, then it must be possible to record the eighth part of 32 (i.e., 4) PCM words in a storage area. Therefore, in the present case a storage element SB has four shift registers SS$ch$ (only one is shown in FIG. 4) which, in accordance with the assumed number of 8 bits for each PCM word, have eight stages.

The storage element illustrated in the drawing has an input EA and an output AA, which is in communication with receive/transmit TDM trunks over an adapter unit A mentioned with reference to FIG. 3 and comprising synchronizing means. An output AK and an input EK from the storage element are not directly in communication with TDM trunks, but are instead connected to corresponding terminals of the SDM switching network nearer the middle. The input of the first shift register stage FF1 is connectable to the input EA over a switch KA$e$, and a connection can be established between the output of the last shift register stage FF8 and the output AA by means of switch KA$s$. The same holds true for the connection between the input of the first shift register stage FF1 and the input EK over the switch KK$e$ or, for the connection of the output of the last shift register stage FF8, with the output AK over the switch KK$a$. The switches KA$e$ and KA$s$, or KK$e$ and KK$s$, are operated in pairs. For the inputs or outputs of the other shift registers (not shown), connection possibilities with the inputs EA, EK of with the outputs AA and AK are likewise provided over separate switches.

Two selection circuits provided individually for each shift register are employed for selecting the switches KA$e$ and KA$s$ and the switches KK$e$ and KK$s$. Either of the selection circuits comprises a four-stage shift register S$ch$A, which is closed over another bistable circuit FFA to form a ring in the manner of a chain-code generator. Using such an arrangement, 31 code-character combinations can be produced which are distinguishable by the potentials occurring across the outputs of the shift register stages of the the additional bistable circuit FFA. These code-character combinations result from the fact that five code-character elements are selected sequentially from 31 consecutive code-character elements as the appropriate code character, each time shifting by one code-character element.

The outputs of the stages of the shift registers, or of the additional bistable circuit FFA, are linked to another input of a first or of a second multiple AND gate UM1 or UM2. The output of the first multiple AND gate UM1 is connected to the control inputs of the switches KA$e$ and KA$s$, the output of the second multiple AND gate UM2 is in communication with the control inputs of the switches KK$e$ and KK$s$.

A specified binary digit combination is preset through continued setting or resetting of the bistable circuits FFA past five time positions upon appropriate reshifting of the entered item of information within the shift register ring, causing a specified time-slot address to be written.

The multiple AND gates UM1 and UM2 transmit an activation signal to the switches whenever the code character LLLLL is applied, which is the case at different times, depending on the adjusted shift-register status calculated from the time of adjustment. Thus, the possibility is afforded of actuating the switches during one of the channel times provided.

Instead of the chain-code generator described hereinabove, a binary counter may likewise be employed which periodically repeats its count.

As a result of the actuation of the switches KA$e$, KA$s$, or KK$e$ and KK$s$, for every pulse frame the shift register SSCH is written at one time from the input EA over the switch KA$e$ and simultaneously read out toward the output AK over the switch KA$s$, or during another time span it is written in from the input EK over the switch KK$e$ and simultaneously read out toward the output AK over the switch KK$s$.

Figure 5:
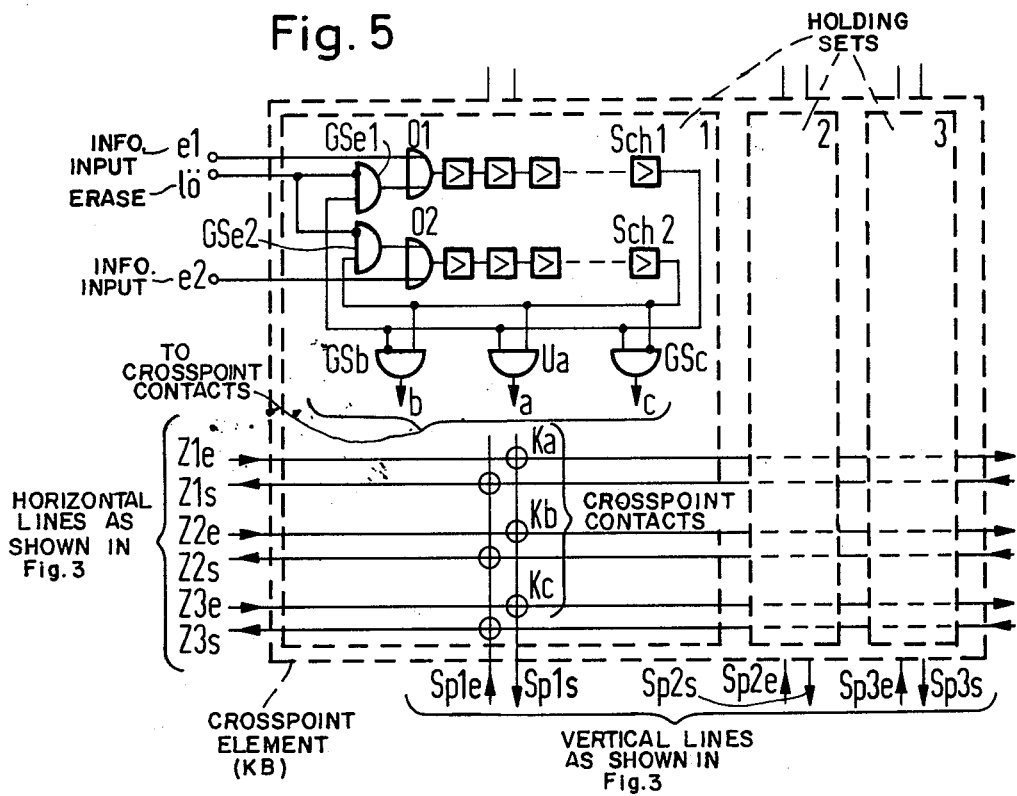
FIG. 5 is a schematic diagram of a component employed in the PCM switching network of the invention for connecting several groups of storages.

With reference to FIG. 5 the construction of a crosspoint unit KB will now be described.

Assuming, as mentioned hereinabove, that every three storage functional planes STE are combined into a supergroup, each of the crosspoint units will have three switching rows of three pairs of crosspoint contacts K$a$, K$b$ and K$c$ each arranged in the manner of a matrix and over which each of the horizontal lines Z1$e$ to Z3$e$ assigned to one direction of transmission may be connected to each corresponding vertical line S$p$1$e$ to S$p$3$e$, or each horizontal line Z1$s$ to Z3$s$ assigned to the other direction of transmission may be connected to the corresponding vertical line S$p$1$s$ to S$p$3$s$.

A crosspoint unit of this kind includes for each switching row a holding set comprising two shift registers SCH1 and SCH2 for 32 bits each. The outputs of the last stages of the shift registers are combined over blocking elements GS$b$ and GS$c$ and over an AND element U$a$, each of the blocking inputs of the blocking elements being connected to another shift register output. The outputs of the three combinational logic elements are each connected to the control inputs of another pair of crosspoints K$a$, K$b$ and K$c$.

The outputs of the last stages of the shift registers SCH1 and SCH2 are likewise connected to the non-blocking input of another input blocking element GS$e$1 of GS$e$2, whose blocking inputs rest together against an erase input 18. The outputs of said input blocking elements are each connected to the input of another of the OR elements 01 or 02, whose other inputs are in communication with an information input $e$1 or $e$2.

One of the input signal combinations 01, 10 or 11 is written over the information inputs e1 and e2 from the control of the switching network, depending on which of the three pairs of crosspoints Ka, Kb, and Kc shall be activated, during the time position corresponding to the time slot during which the crosspoints concerned shall be activated. The combination is now shifted further step by step by the shift-register clock pulse and reaches the outputs of the last shift-register stages one pulse-frame duration later. Depending on the signal combination, one of the pairs of crosspoints Ka, Kb and Kc is activated over one of the combinational logic elements Ua, GSb or GSc. At the same time, the signal combination is rewritten over the input blocking elements GSe1 and GSe2 or over the subsequent OR elements 01 or 02, causing a cyclic and timely activation of the pair of crosspoints involved, as long as no erase potential is applied at the erase input 18 inhibiting the input blocking elements.

The principles of the invention are described hereinabove in terms of the description of a preferred embodiment constructed according to those principles. The described embodiment is considered to be exemplary, and it is contemplated that it can be modified or changed in a variety of ways while remaining within the scope of the invention as defined by the appended claims.

I claim:

1. In a pulse code modulation/time division multiplex (PCM/TDM) switching network in a PCM tandem exchange for the connection of receive PCM/TDM trunks to transmit PCM/TDM trunks and for the time allocation of time slots to be used on the receive trunks to time slots to be used on the transmit trunks, the improvement comprising:

a plurality of storages each associated with a pair of receive and transmit PCM/TDM trunks, each of said plurality of storages having a storage capacity corresponding to the amount of data transferable over a PCM/TDM trunk within one sampling pulse frame, each of said plurality of storages comprising a plurality of storage areas selectively connectible to said associated pair of PCM/TDM trunks by a first pair of input/output connections, each of said storage areas comprising at least one storage location for storing a PCM word, wherein one of said storage locations is repeatedly seized during each sampling pulse frame assigned to a given call to sequentially store data incoming over said associated receive PCM/TDM trunk and data outgoing over said associated transmit PCM/TDM trunk, each of said storage areas having a second pair of input/output connections which are not connectible to said associated pair of PCM/TDM trunks, wherein said second pairs of input/output connections of said storage areas in one of said plurality of storages are connected to the second pairs of input/output connections of corresponding ones of said storage areas in a number of the other of said plurality of storages to thereby enable said switching network to selectively convey data over said PCM/TDM trunks.

2. The switching network defined in claim 1 wherein said plurality of storages are combined in groups in accordance with the connections of said second pairs of input/output connections of said storage areas of said plurality of storages and wherein said switching network further comprises:

space division multiplex (SDM) switching network means associated with said groups of storages for selectively connecting said plurality of storages together.

3. The switching network defined in claim 1 wherein said groups of storages are formed structurally into a module of a first type and the switching elements of said SDM switching network means are parts of at least one module of a second type.

4. The switching network defined in claim 1 wherein each of said storage means comprises a number of shift registers corresponding to the number of PCM words to be stored in said storage area, each of said shift registers having a number of bistable stages corresponding to the number of bits in a PCM word, each of said storage areas further comprising:

first switch means for selectively connecting the first bistable stage in the direction of data flow of said shift registers to the receive PCM/TDM trunk at said first input connection of the storage area;

second switch means for selectively connecting the first bistable stage in the direction of data flow of said shift registers to said second input connection of the storage area;

third switch means actuated simultaneously with said first switch means for selectively connecting the last bistable stage in the direction of data flow of the shift registers to the transmit PCM/TDM trunk at said first output connection of the storage area; and fourth switch means actuated simultaneously with said second switch means for selectively connecting the last bistable stage in the direction of data flow of the shift registers to said second output connection of the storage area.

5. The switching network defined in claim 4 further comprising:

means for generating activating signals for said first through fourth switch means for each said storage area including two additional shift registers, each switched to operate as a chain code generator, two further bistable switch means connecting, respectively, the outputs of the inputs of said additional shift registers, two AND gates having inputs connected, respectively, to the bistable stage outputs of said additional shift registers, said AND gates having outputs connected, respectively, to control inputs of said first and second and said third and fourth switch means.

6. The switching network defined in claim 3 wherein said module of said second type includes a number of switching rows corresponding to the number of groups of storages within a supergroup and the same number of pairs of switching elements actuated in pairs and utilized for the other of two directions of transmission.

7. The switching network defined in claim 6 wherein each said module of the second type further comprises at least two shift registers for each switching row for activating said pairs of switching elements each having a number of bistable stages equal to the number of time slots within a sampling pulse frame, the output of each of said shift registers being connected to the input thereof over a separate blocking gate means, each said blocking gate means having a blocking input energized by an erase block pulse, and a plurality of combinational logic elements having inputs connected to both the inputs of said blocking gate means and the outputs of said shift registers, each logic element having an output connected to a control input of said switching elements.

* * * * *